United States Patent
Kanekawa et al.

(10) Patent No.: US 10,246,126 B2
(45) Date of Patent: Apr. 2, 2019

(54) FEEDBACK CONTROL APPARATUS, ELECTRICALLY DRIVEN POWER STEERING APPARATUS

(71) Applicant: Hitachi Automotive Systems, Ltd., Hitachinaka-shi, Ibaraki (JP)

(72) Inventors: Nobuyasu Kanekawa, Tokyo (JP); Ryoichi Kobayashi, Hitachinaka (JP); Tomonobu Koseki, Hitachinaka (JP); Tomishige Yatsugi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 67 days.

(21) Appl. No.: 15/506,022

(22) PCT Filed: Jun. 29, 2015

(86) PCT No.: PCT/JP2015/068601
§ 371 (c)(1),
(2) Date: Feb. 23, 2017

(87) PCT Pub. No.: WO2016/031377
PCT Pub. Date: Mar. 3, 2016

(65) Prior Publication Data
US 2017/0253269 A1    Sep. 7, 2017

(30) Foreign Application Priority Data

Aug. 27, 2014 (JP) .................................. 2014-172583

(51) Int. Cl.
*B62D 5/00* (2006.01)
*B62D 6/00* (2006.01)
(Continued)

(52) U.S. Cl.
CPC ............ *B62D 5/0481* (2013.01); *B62D 6/00* (2013.01); *G05B 9/02* (2013.01); *G05B 11/36* (2013.01); *G05B 11/42* (2013.01); *G05B 15/02* (2013.01)

(58) Field of Classification Search
CPC . B62D 6/00; B62D 5/00; G05B 15/00; G05B 15/02; G05B 11/36; G05B 11/42
See application file for complete search history.

(56) References Cited

U.S. PATENT DOCUMENTS 7,782,000 B2 * 8/2010 Suzuki ................. B62D 5/0484
180/443
7,990,094 B2 * 8/2011 Tamaizumi ............ B62D 5/046
318/400.02
(Continued)

FOREIGN PATENT DOCUMENTS

JP          9-134202 A    5/1997
JP       2005-32261 A    2/2005
(Continued)

OTHER PUBLICATIONS

International Search Report (PCT/ISA/210) issued in PCT Application No. PCT/JP2015/068601 dated Aug. 4, 2015 with English-language translation (three (3) pages).
(Continued)

*Primary Examiner* — Yonel Beaulieu
(74) *Attorney, Agent, or Firm* — Crowell & Moring LLP

(57) ABSTRACT

An object of the present invention is to realize a feedback control apparatus and an electrically driven power steering apparatus capable of safely continuing control operation even in the event of the occurrence of a soft error. A controller 202 of the present invention determines a d-axis target voltage Vd and a q-axis target voltage Vq, which are control values for controlling an output value of the electrically driven power steering apparatus on the basis of a (Continued)

d-axis error signal δId and a q-axis error signal δIq, which are input values. In this processing, in a period before the occurrence of the soft error, the controller 202 determines the d-axis target voltage Vd and the q-axis target voltage Vq by means of PID control that uses a current input value and a past input value. In a period after the occurrence of the soft error, the d-axis target voltage Vd and the q-axis target voltage Vq are determined by means of P control that uses a current input value but does not use a past input value. In a period after a lapse of the above period, the PID control is resumed.

8 Claims, 13 Drawing Sheets

(51) Int. Cl.
  *G05B 9/02*   (2006.01)
  *G05B 11/36*  (2006.01)
  *G05B 11/42*  (2006.01)
  *G05B 15/02*  (2006.01)
  *B62D 5/04*   (2006.01)

(56) References Cited

U.S. PATENT DOCUMENTS

| | | | | |
|---|---|---|---|---|
| 8,283,881 | B2* | 10/2012 | Gallegos-Lopez | H02P 21/06 |
| | | | | 318/400.02 |
| 9,174,667 | B2* | 11/2015 | Suzuki | B62D 5/0403 |
| 9,331,627 | B2* | 5/2016 | Omata | H02P 29/032 |
| 2006/0022626 | A1 | 2/2006 | Kobayashi et al. | |

FOREIGN PATENT DOCUMENTS

| | | |
|---|---|---|
| JP | 2006-44338 A | 2/2006 |
| JP | 2013-86718 A | 5/2013 |

OTHER PUBLICATIONS

Japanese-language Written Opinion (PCT/ISA/237) issued in PCT Application No. PCT/JP2015/068601 dated Aug. 4, 2015 (three (3) pages).

\* cited by examiner

FEEDBACK CONTROL APPARATUS, ELECTRICALLY DRIVEN POWER STEERING APPARATUS

TECHNICAL FIELD

The present invention relates to a feedback control apparatus and an electrically driven power steering apparatus using the feedback control apparatus.

BACKGROUND ART

In recent years, as the automation of control using an electronic control device configured by the use of a microcomputer or the like progresses, there has been an increasing need of the safety and reliability of the electronic control device. For example, in the event of the occurrence of an abnormality in an electronic control device, it is needed to immediately stop the operation or to continue the control operation to the possible extent while the safety is ensured.

As an example of performing control using an electronic control device such as the one described above, a vehicular electrically driven power steering apparatus is known. With an improvement in performance in recent years, electrically driven power steering apparatuses are also applied to a large-sized car with a great weight. However, particularly, a large-sized car requires a large human-powered steering force when the operation of an electrically driven power steering apparatus is stopped. Therefore, it is necessary to continue the operation of the electrically driven power steering apparatus even in the event of the occurrence of a malfunction while the safety is ensured.

With an improvement in degree of integration of a microcomputer in recent years, there is a concern about an increase in rate of occurrence of a soft error due to disturbance, e.g., cosmic rays. Soft error is also referred to as SEU (Single Event Upset) and is categorized as a temporary failure (transient fault) that occurs during the operation of a microcomputer. When a soft error occurs, a bit inversion occurs in data stored in the microcomputer, resulting in generation of abnormal data. In this case, in the case of data stored in a memory of the microcomputer, the abnormal data can be detected or corrected by means of an error correcting code (ECC). However, generally, an error correcting code is not added to data stored in a register in a processor of the microcomputer. Therefore, the occurrence of an abnormality in the data of the register due to a soft error can lead to false operation or runaway of the processor. Furthermore, in this case, the data stored in the memory can be lost due to false operation or runaway of the processor. As a result, safe control becomes difficult to continue.

It is preferable that an electronic control device safely continues control even in the event of the occurrence of a data abnormality due to a soft error such as the one described above. In this respect, PTL 1 described below discloses an electrically driven power steering apparatus for performing feedback control on the basis of a motor current detected by a current detector wherein, when feedback control is disabled due to a malfunction of the current detector, switching to feedforward control that does not use a motor current detected by the current detector is performed and assisting of handle steering is continued.

CITATION LIST

Patent Literature

PTL 1: JP 2006-44338 A

SUMMARY OF INVENTION

Technical Problem

According to the technique described in PTL 1, when the feedback control is switched to the feedforward control, a control error with respect to a target value becomes excessively large. Furthermore, after switching to the feedforward control is once performed, the feedback control cannot be restored. Therefore, the technique is not suitable for addressing a temporary failure, e.g., a soft error.

The present invention has been made in order to overcome the aforementioned problem of the conventional technique. It is a primary object of the present invention to realize a feedback control apparatus and an electrically driven power steering apparatus that can safely continue control operation even in the event of the occurrence of a soft error.

Solution to Problem

A feedback control apparatus according to an aspect of the present invention is for determining a control value for controlling an output value on the basis of an input value depending on a difference between a target value and the output value, wherein in a first period before occurrence of a soft error, the control value is determined by means of first feedback control using a current input value and a past input value, in a predetermined second period after the occurrence of the soft error, the control value is determined by means of second feedback control using a current input value but not using a past input value, and in a third period after a lapse of the second period, the first feedback control is resumed.

A feedback control apparatus according to another aspect of the present invention is for determining a control value for controlling an output value on the basis of an input value depending on a difference between a target value and the output value, wherein in a first period before occurrence of a soft error, a steady-state deviation between the target value and the output value is a predetermined first value, and in a predetermined second period after the occurrence of the soft error, a steady-state deviation between the target value and the output value is greater than the first value.

An electrically driven power steering apparatus according to the present invention includes: the above described feedback control apparatus; a motor for generating an assist torque to a steering mechanism; and an inverter for driving the motor on the basis of a control value determined by the feedback control apparatus.

Advantageous Effects of Invention

According to the present invention, a feedback control apparatus and an electrically driven power steering apparatus that can safety continue control operation even in the event of the occurrence of a soft error can be realized.

DESCRIPTION OF EMBODIMENTS

Embodiments of the present invention will be described below on the basis of the drawings.

First Embodiment

Figure 1A:
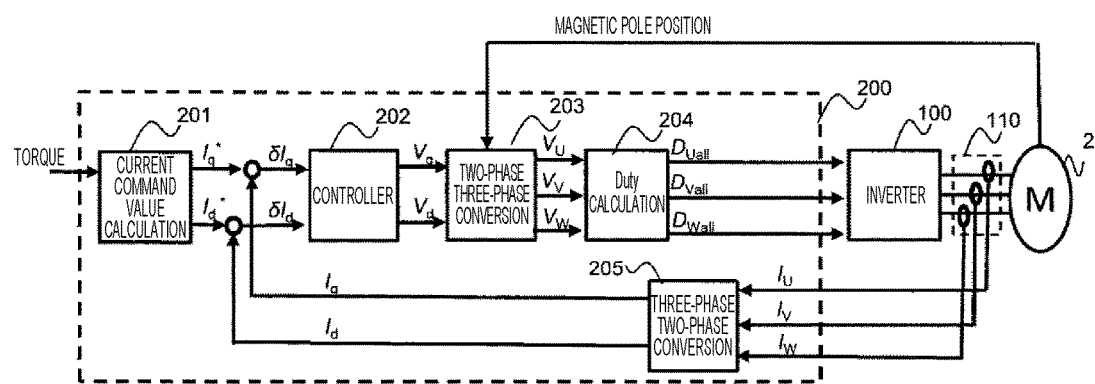
FIGS. 1A and 1B are diagrams illustrating a configuration of an electrically driven power steering apparatus according to a first embodiment of the present invention.
Figure 1B:
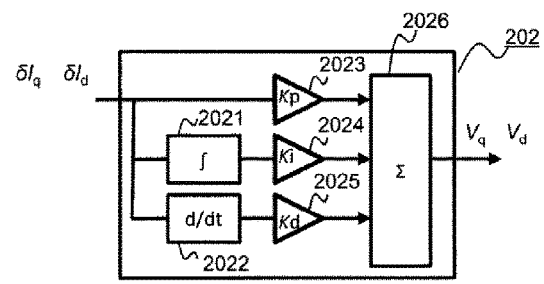

FIGS. 1(a) and 1(b) are diagrams illustrating a configuration of an electrically driven power steering apparatus according to the first embodiment of the present invention. FIG. 1(a) is a diagram illustrating an entire configuration of the electrically driven power steering apparatus. FIG. 1(b) is a control block diagram of a controller 202 of the electrically driven power steering apparatus.

As illustrated in FIG. 1(a), the electrically driven power steering apparatus includes a motor 2, an inverter 100, and a control system 200. The motor 2 is a three-phase AC motor for generating an assist torque with respect to a steering mechanism, which is not illustrated, arranged on a vehicle on which the electrically driven power steering apparatus is mounted, and its driving is controlled by the inverter 100. On the basis of target duty cycles Duall, Dvall and Dwall output to each of a U-phase, a V-phase, and a W-phase of the motor 2 from the control system 200, the inverter 100 drives switching elements, which are not illustrated, of the respective phases by means of PWM control. Thus, currents Iu, Iv, Iw of the respective phases flowing to the motor 2 are controlled, and the motor 2 is driven.

The control system 200 functionally includes a current command value calculation portion 201, the controller 202, a two-phase three-phase conversion portion 203, a duty calculation portion 204, and a three-phase two-phase conversion portion 205.

The currents Iu, Iv, Iw of the respective phases flowing to the motor 2 are detected by a current sensor 110, which is arranged on AC output lines of the respective phases connected between the inverter 100 and the motor 2, and are input to the control system 200. The three-phase two-phase conversion portion 205 converts the values of the currents Iu, Iv, Iw of the respective phases detected by the current sensor 110 into a d-axis current Id and a q-axis current Iq.

The current command value calculation portion 201 calculates a d-axis current command value Id* and a q-axis current command value Iq* on the basis of a torque command which is externally input depending on, e.g., the quantity of steering of a driver with respect to the steering mechanism. Values obtained by subtracting the d-axis current Id and the q-axis current Iq, which are determined by the three-phase two-phase conversion portion 205, from the d-axis current command value Id* and the q-axis current command value Iq*, respectively, are input to the controller 202 as a d-axis error signal δId and a q-axis error signal δIq. Specifically, the d-axis error signal δId and the q-axis error signal δIq, which are values input to the controller 202, are determined depending on a difference between a torque command, which is a control target value of the electrically driven power steering apparatus, and an output torque of the motor 2, which is an output value with respect to the torque command.

The controller 202 functions as a feedback control apparatus according to an embodiment of the present invention. The controller 202 performs feedback control depending on an input value. Specifically, the controller 202 determines a d-axis target voltage Vd and a q-axis target voltage Vq as control values for controlling an output torque of the motor 2 with respect to a torque command on the basis of the d-axis error signal δId and the q-axis error signal δIq, which have been input. This feedback control is described in detail with reference to FIG. 1(b) below.

The two-phase three-phase conversion portion 203 converts the d-axis target voltage Vd and the q-axis target voltage Vq, which have been determined by the controller 202, to voltage target values Vu, Vv, Vw of the respective phases on the basis of magnetic pole position information output from a magnetic pole position sensor, which is not illustrated, which is arranged on the motor 2.

The duty calculation portion 204 calculates target duty cycles Duall, Dvall, Dwall of the respective phases on the basis of the voltage target values Vu, Vv, Vw, which have been determined by the two-phase three-phase conversion portion 203, and outputs the target duty cycles Duall, Dvall, Dwall to the inverter 100.

Next, a control block diagram of the controller 202 illustrated in FIG. 1(b) is described. As illustrated in FIG. 1(b), the controller 202 includes control blocks of an integrator 2021, a differentiator 2022, amplifiers 2023, 2024 and 2025, and an adder 2026.

The amplifier 2023 multiplies the values of the d-axis error signal δId and the q-axis error signal δIq, which have been input to the controller 202 as input values, by a predetermined proportional gain factor Kp, and outputs the calculation results to the adder 2026.

The integrator 2021 retains, as internal data, the results of accumulation of the values of the d-axis error signal δId and the q-axis error signal δIq, which have been input to the controller 202 in a time-series manner, and calculates integral values of the d-axis error signal δId and the q-axis error signal δIq. The amplifier 2024 multiplies the integral values of the d-axis error signal δId and the q-axis error signal δIq, which have been determined by the integrator 2021, by a predetermined integral gain factor Ki, and outputs the calculation results to the adder 2026.

The differentiator 2022 determines differences between the values of current d-axis error signal δId and q-axis error signal δIq, which have been input to the controller 202, and values of last d-axis error signal δId and q-axis error signal δIq retained as internal data, and calculates derivative values of the d-axis error signal δId and the q-axis error signal δIq. The amplifier 2025 multiplies the derivative values of the d-axis error signal δId and the q-axis error signal δIq, which have been determined by the differentiator 2022, by a predetermined derivative gain factor Kd, and outputs the calculation results to the adder 2026.

The adder 2026 determines a d-axis target voltage Vd and a q-axis target voltage Vq, which are control values, on the basis of the total values of the aforementioned calculation values.

The feedback control of the controller 202 performed according to the above-described control block diagram is called PID control. The PID control performed by the controller 202 is described in more detail below.

When an input value is represented by u(t) and a control value to be output is represented by y(t) regarding the PID control, the relationship between the input value u(t) and the control value y(t) is represented by formula (1) below using the aforementioned proportional gain factor Kp, integral gain factor Ki, and derivative gain factor Kd. The input value u(t) represents a control deviation (a deviation between an output value and a target value).

[Mathematical Formula 1]

$$y(t) = Kp \cdot u(t) + Ki \cdot \int_0^t u(\tau)d\tau + Kd \cdot \frac{du(t)}{dt} \quad (1)$$

On the right side of the aforementioned formula (1), the value of the first term is determined depending on the input value u(t) at current time t. The value of the second term, which is a product of the integral gain factor Ki and the calculation results of the integral value by the integrator 2021, is determined depending on the results of accumulation of input values from time 0 to current time t. Specifically, it can be said that the value of the second term is historical data determined by the history of past input values. Furthermore, the value of the third term, which is a product of the derivative gain factor Kd and the calculation results of the derivative value by the differentiator 2022, is determined depending on a change of a present input value u(t) with respect to a last input value. Specifically, similarly to the value of the second term, it can also be said that the value of the third term is historical data determined by the history of past input values meanwhile the accumulation time is shorter.

As described above, the control value y(t) of the PID control is determined by a current input value u(t) and the historical data of past input values. Specifically, the PID control is feedback control that uses a current input value and a past input value.

Figure 2:
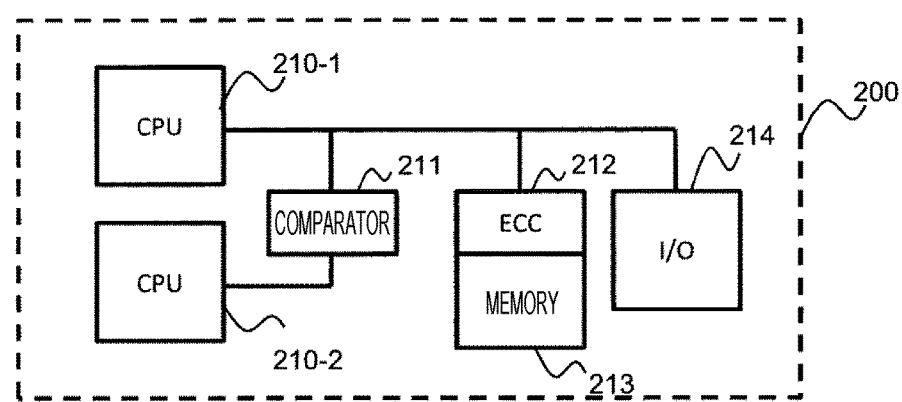
FIG. 2 is a diagram illustrating an example of a hardware configuration of a control system.

Next, a hardware configuration of the control system 200 is described. FIG. 2 is a diagram illustrating an example of a hardware configuration of the control system 200. The configurations of the control system 200 illustrated in FIG. 1(a) can be realized by a hardware configuration such as the one illustrated in FIG. 2.

In an example illustrated in FIG. 2, the control system 200 includes CPUs 210-1 and 210-2, a comparator 211, an ECC circuit 212, a memory 213, and an I/O device 214. The CPUs 210-1 and 210-2 execute a program stored in the memory 213 to realize control processing corresponding to the control blocks of FIG. 1(a). Thus, the control system 200 concurrently operates the two CPUs to carry out redundant processing.

The comparator 211 compares an output of the CPU 210-1 and an output of the CPU 210-2, and determines the presence or absence of an abnormality in the results of the processing. In the event of the occurrence of a persistent failure, e.g., a hardware malfunction, or a transient failure, e.g., a soft error, in the CPU 210-1 or CPU 210-2, the outputs of the CPU 210-1 and CPU 210-2 are inconsistent. In this case, the comparator 211 determines that an abnormality is present in the processing results of either of them.

When an abnormality is determined by the comparator 211, the CPUs 210-1 and 210-2 both execute predetermined reset processing. This reset processing restores and reconfigures variables required for resuming the control processing, for example, variables and program counters used by the operating system, e.g., various pointers, semaphores, and counters. Furthermore, the reset processing resets various control data stored in the memory 213 to initial values. The control data includes the integral values for PID control determined by the integrator 2021 and the derivative values for PID control determined by the differentiator 2022 of FIG. 1(b). With an improvement in operation speed of a processor in recent years, the resetting of variables as described above can be performed in a negligibly short amount of time as compared to the time constant of the control subject.

After completion of the reset processing, the CPUs 210-1 and 210-2 resume the control processing. When an abnormality is continuously determined even after the resuming of the control processing due to a persistent failure, e.g., a hardware malfunction, the operation of the control system 200 is preferably stopped. For its determination, hardware diagnosis or the like may be performed after the reset processing.

The ECC circuit 212 adds an error correcting code (ECC) to data which is input and output between the CPUs 210-1 and 210-2 and the memory 213, and, when the data is erroneous, detects and corrects the error on the basis of the error correcting code. The I/O device 214 inputs and outputs data between the control system 200 and an external device.

The hardware configuration of the control system 200 described above is an example. A different hardware configuration may be used. For example, three or more CPUs may be used to have redundant processing, or only one CPU may be used non-redundantly. Any hardware configuration may be used insofar as the control system 200 such as the one illustrated in FIG. 1(a) can be realized.

Next, processing in the event of the occurrence of a soft error in the controller 202 is described. When a soft error occurs in the CPU 210-1 or CPU 210-2 in the controller 202, an abnormality is determined by the comparator 211 and the reset processing is performed by the CPU 210-1 and the CPU 210-2 accordingly as described above. As a result, the contents of the integrator 2021 and the differentiator 2022 are reset and their internal data are deleted by the control blocks illustrated in FIG. 1(b). Therefore, immediately after the resuming of the control processing, the PID control using the integral value and the derivative value, which are historical data, cannot be executed.

Therefore, in a predetermined period after the resuming of the control processing, the controller 202 performs feedback control that uses a current input value but does not use a past input value, and restores the internal data of the integrator 2021 and the differentiator 2022 by the convergence operation of the feedback control. Specifically, in the aforementioned formula (1), the integral gain factor Ki of the second term and the derivative gain factor Kd of the third term are reduced to zero, so that a control value is determined by P control, which is feedback control that uses only the value of the first term corresponding to the current input value. In this case, the d-axis error signal δId and the q-axis error signal δIq, which are input values, are continuously input to the integrator 2021 and the differentiator 2022 so that their internal data are restored. After the internal data of the integrator 2021 and the differentiator 2022 are restored, the controller 202 restores the integral gain factor Ki and the derivative gain factor Kd to initial values to resume the PID control, returning to normal control operation.

Figure 3:
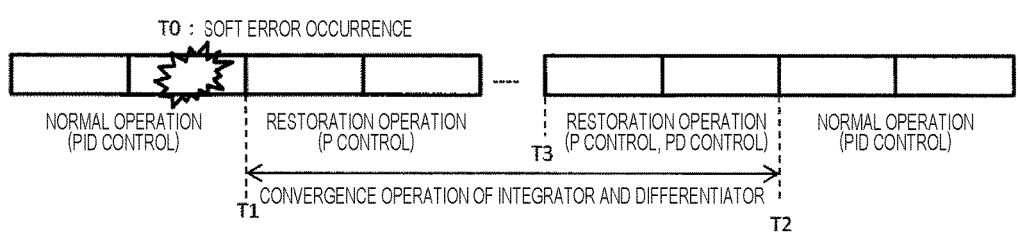
FIG. 3 is a diagram illustrating an example of processing in the event of the occurrence of a soft error by a first processing method.
Figure 4:
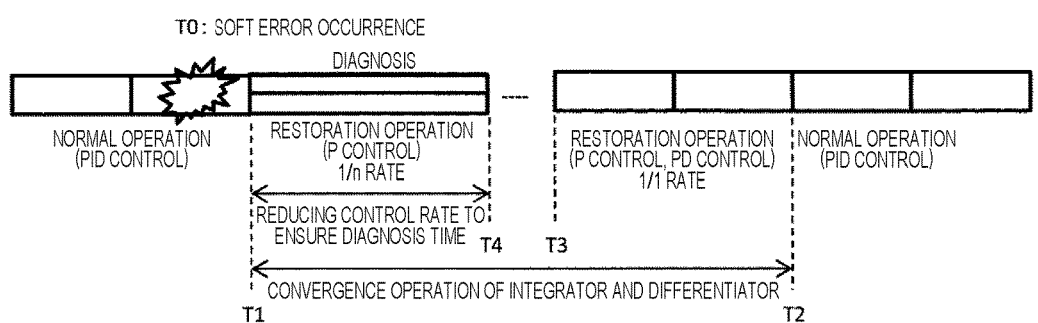
FIG. 4 is a diagram illustrating an example of processing in the event of the occurrence of a soft error by a second processing method.
Figure 5:
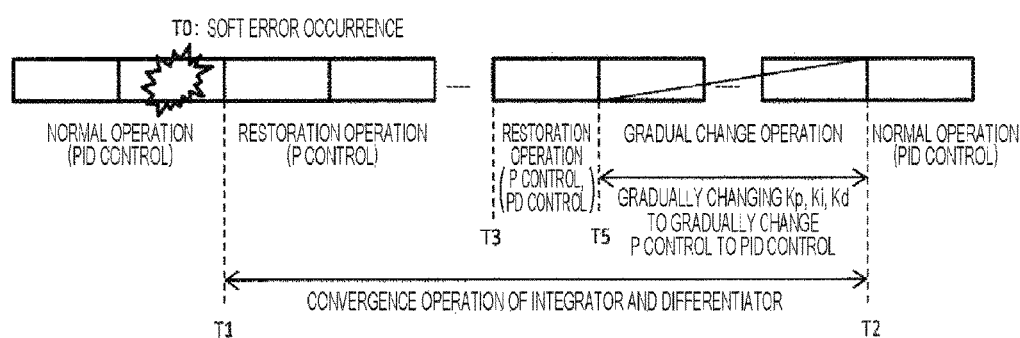
FIG. 5 is a diagram illustrating an example of processing in the event of the occurrence of a soft error by a third processing method.

A series of processing in the event of the occurrence of a soft error described above is described in more detail with reference to FIGS. 3 to 5. FIG. 3 is a diagram illustrating an example of processing in the event of the occurrence of a soft error by the first processing method. FIG. 4 is a diagram illustrating an example of processing in the event of the occurrence of a soft error by the second processing method. FIG. 5 is a diagram illustrating an example of processing in the event of the occurrence of a soft error by the third processing method. In the event of the occurrence of a soft error, the controller 202 is capable of performing processing according to any of the processing methods illustrated in the drawings. In any of FIGS. 3 to 5, it is assumed that the controller 202 normally operates and performs control operation of the PID control before the occurrence of a soft error at time T0.

In the first processing method illustrated in FIG. 3, when a soft error occurs at time T0, the controller 202 switches the control processing after time T1 after the performance of the aforementioned reset processing from the PID control performed before the occurrence of the soft error to the P control, which is feedback control that does not use historical data. Then, in a period from time T1 to time T2, the convergence operation is performed to restore the internal data of the integrator 2021 and the differentiator 2022 required for the PID control. When the internal data of the integrator 2021 and the differentiator 2022 are thus restored, the controller 202 switches the control processing after time T2 from the P control to the PID control, and returns to the control state held before the occurrence of the soft error.

The internal data of the differentiator 2022 are the last d-axis error signal δId and q-axis error signal δIq as described above. Therefore, the internal data can be restored by a lapse of at least one control cycle (control frame). Accordingly, preferably, in a period from time T1 to time T3, the internal data of the differentiator 2022 is preferentially restored and, in a subsequent period from T3 to time T2, the internal data of the integrator 2021 is restored. At this time, in a period from time T3 to time T2, the P control (PD control) including the derivative value determined by the differentiator 2022 may be performed.

In the second processing method illustrated in FIG. 4, in the event of the occurrence of a soft error at time T0, as in the first processing method, the controller 202 switches the control processing after time T1 from the PID control to the P control. At this time, in a period from time T1 to time T4, the control rate of the controller 202 is reduced, so that the cycle of the P control performed in this period is made longer than the cycle of the PID control before time T1. Thus, the proportion of time allocated to the control processing in the controller 202 is reduced as compared to that in normal time, and time for performing processing required for continuation of control operation after the occurrence of a soft error, e.g., diagnosis of the hardware and correction of various setting values, is ensured.

In a period from time T1 to time T4, when the control rate is reduced as described above, a dead-time delay in the P control is increased, thereby reducing the phase margin. For compensation of this, in a period from time T1 to time T4, the proportional gain factor Kp is preferably reduced as compared to that in normal time.

When the internal data of the integrator 2021 and the differentiator 2022 are restored, as in the first processing method, the controller 202 switches the control processing after time T2 from the P control to the PID control, and returns to the control state held before the occurrence of the soft error. As described with regard to the first processing method, the internal data of the differentiator 2022 may be restored in a period from time T1 to time T3, and the P control (PD control) including the derivative value determined by the differentiator 2022 may be performed in a period from time T3 to time T2.

In the third processing method illustrated in FIG. 5, when a soft error occurs at time T0, as in the first and second processing methods, the controller 202 switches the control processing after time T1 from the PID control to the P control. Then, when the internal data of the integrator 2021 and the differentiator 2022 are restored by time T5, the controller 202 makes a gradual transition from the P control to the PID control in a period from time T5 to time T2. Specifically, the values of the proportional gain factor Kp, the integral gain factor Ki, and the derivative gain factor Kd are gradually changed from the values for the P control to the values for the PID control. Thus, during switching from the P control to the PID control, a rapid change of the control value is suppressed, enabling smooth control switching. After completion of transition to the PID control at time T2, as in the first and second processing methods, the control state held before the occurrence of the soft error is restored.

As is described with regard to the first processing method, also in the third processing method, it is preferable that the internal data of the differentiator 2022 is restored in a period from T1 to time T3. In this case, as in the first and second processing methods, in a period from time T3 to time T5 where the internal data of the integrator 2021 is restored and the transition to the PID control begins, the P control (PD control) including the derivative value determined by the differentiator 2022 may be performed.

Figure 6:
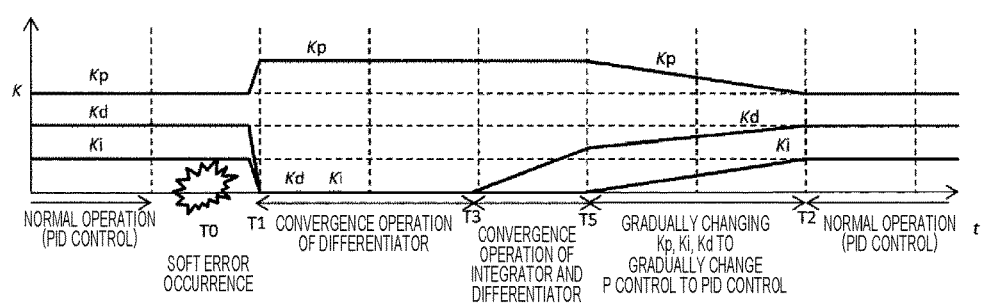
FIG. 6 is a diagram illustrating the state of changes of a proportional gain factor Kp, an integral gain factor Ki, and a derivative gain factor Kd by the third processing method.

FIG. 6 is a diagram illustrating the state of changes of the proportional gain factor Kp, the integral gain factor Ki, and the derivative gain factor Kd in the third processing method. As illustrated in FIG. 6, the controller 202 increases the proportional gain factor Kp and reduces the integral gain factor Ki and the derivative gain factor Kd to zero at time T1, and switches the PID control to the P control. Then, when the internal data of the differentiator 2022 are restored, in a period from time T3 to time T5, the derivative gain factor Kd is gradually increased so that the PD control is performed. The P control may be continued while the derivative gain factor Kd is kept at zero.

When the internal data of the integrator 2021 are restored, the controller 202 gradually reduces the proportional gain factor Kp and gradually increases the integral gain factor Ki and the derivative gain factor Kd in a period from time T5 to time T2 so that the P control (PD control) gradually transitions to the PID control. At time T2, when the proportional gain factor Kp, the integral gain factor Ki, and the derivative gain factor Kd are returned to the values held before the occurrence of the soft error, the controller 202 performs the PID control in a subsequent period.

Figure 7:
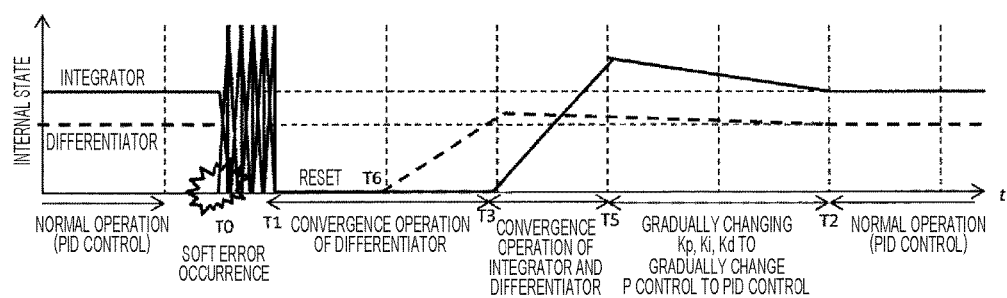
FIG. 7 is a diagram illustrating the state of changes of internal data of an integrator and a differentiator by the third processing method.

FIG. 7 is a diagram illustrating the state of changes of the internal data of the integrator 2021 and the differentiator 2022 in the third processing method. As illustrated in FIG. 7, when a soft error occurs at time T0, the internal data of the integrator 2021 and the differentiator 2022 become indeterminate. Then, as the reset processing is performed, the internal data of the integrator 2021 and the differentiator 2022 are reset to zero at time T1.

When the resetting of the differentiator 2022 is canceled at time T6, the convergence operation of the differentiator 2022 begins, and the internal data of the differentiator 2022 is gradually restored from zero. Subsequently, when the resetting of the integrator 2021 is canceled at time T3, the convergence operation of the integrator 2021 begins, and the internal data of the integrator 2021 is gradually restored from zero.

As described above, in the third processing method, the internal data of the integrator 2021 and the differentiator 2022 are reset after the occurrence of a soft error, and switching to the P operation is performed. Then, the proportional gain factor Kp, the integral gain factor Ki, and the derivative gain factor Kd are gradually changed and the PID control is resumed. Thus, as compared to an anti-windup manner of conventional PID control where a convergence predictive value of an integral is used or integral operation is temporarily stopped when an output is excessive, the internal data of the integrator 2021 can be converged promptly.

Figure 8:
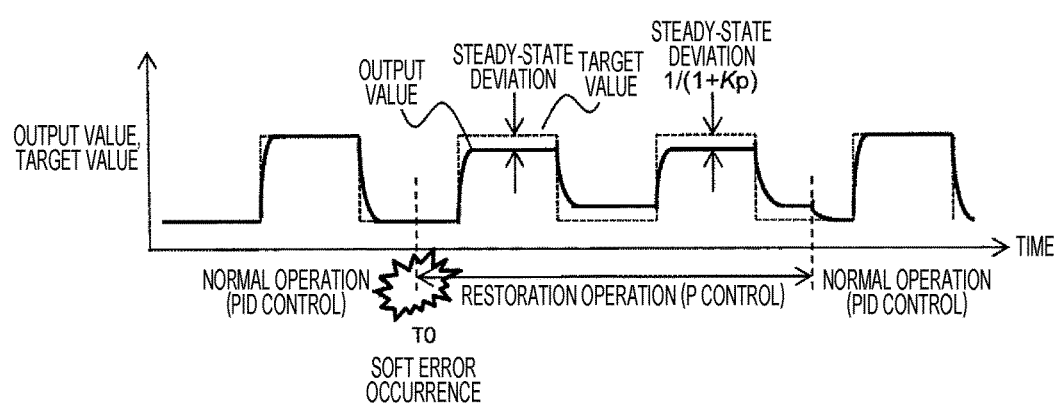
FIG. 8 is a diagram illustrating the state of a change of an output value of a control system in cases where a control target value is changed into a square wave shape.

FIG. 8 is a diagram illustrating the state of a change of an output value in cases where a control target value is changed into a square wave shape. In this case, as illustrated in FIG. 8, when a soft error occurs at time T0, in a period from switching to the P control and switching back to the PID control, a steady-state deviation between the target value and the output value is increased as compared to that in normal time. The level of the steady-state deviation at this time can be represented as 1/(1+Kp) using the proportional gain factor Kp because the control system of the P control corresponds to a type 0 control system where the number of integrators is zero. In PID control periods before the occurrence of the soft error and after the restoration of the internal data of the integrator 2022, the steady-state deviation is roughly zero.

Figure 9:
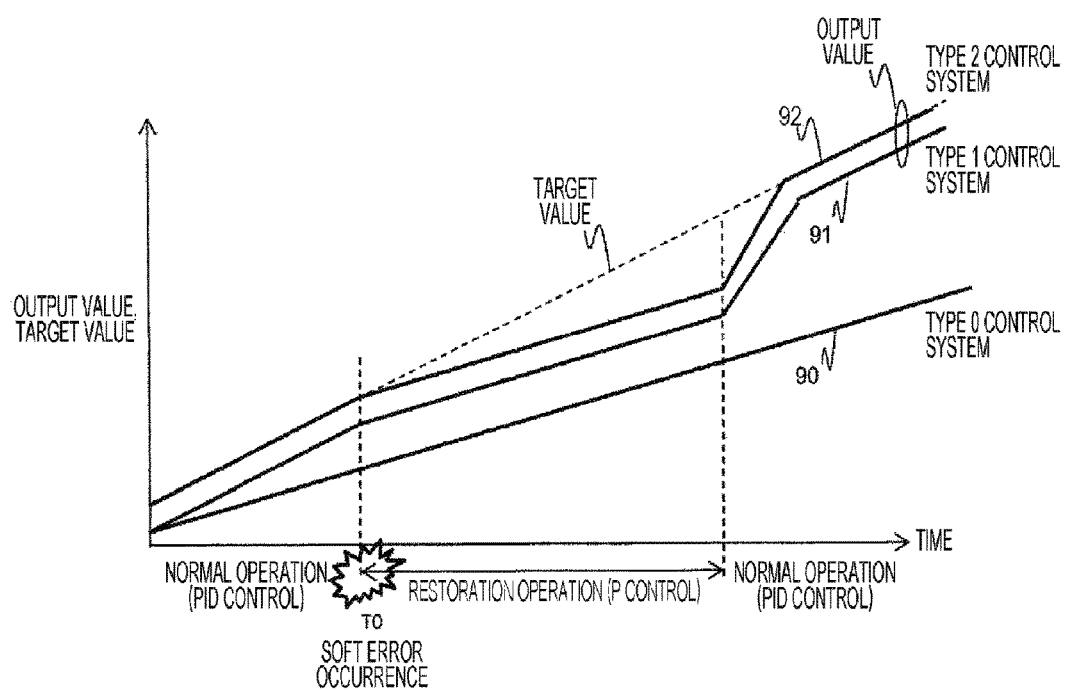
FIG. 9 is a diagram illustrating the state of changes of output values of a control system in cases where a control target value varies in a ramp input pattern.

FIG. 9 is a diagram illustrating the state of changes of output values in cases where a control target value varies in a ramp input pattern. In FIG. 9, a waveform 91 indicates an output value in the case of a type 1 control system where one integrator 2021 is provided in the controller 202 as illustrated in FIG. 1(b). A waveform 92 indicates an output value in the case of a type 2 control system where two integrators 2021 are provided in the controller 202. Furthermore, a waveform 90, which is given as a reference in FIG. 9, indicates an output value of a type 0 control system where the number of integrators is zero.

In cases where a control target value varies in a ramp input pattern, as illustrated in FIG. 9, when a soft error occurs at time T0, in a period from switching to the P control and switching back to the PID control, a steady-state deviation between the target value and the output value is gradually increased. In either case of the type 1 control system or the type 2 control system, the gradient of the output value at this time is equal to that of the type 0 control system. In PID control periods before the occurrence of the soft error and after the restoration of the internal data of the integrator 2022, a steady-state deviation is a constant value in the case of the type 1 control system and is roughly zero in the case of the type 2 control system.

According to the first embodiment of the present invention described above, the following functional effects are provided.

(1) The controller 202, which functions as a feedback control apparatus, determines the d-axis target voltage Vd and the q-axis target voltage Vq, which are control values for controlling an output value of the electrically driven power steering apparatus, on the basis of the d-axis error signal δId and the q-axis error signal δIq, which are input values. In this processing, the controller 202 determines the d-axis target voltage Vd and the q-axis target voltage Vq, which are control values, by means of the PID control that uses a current input value and a past input value in a period before time T0 where a soft error occurs. In a period from time T1 after the occurrence of the soft error to time T2 (or time T3), the controller 202 determines the d-axis target voltage Vd and the q-axis target voltage Vq, which are control values, by means of the P control that uses a current input value but does not use a past input value. Furthermore, in a subsequent period from time T2 after the lapse of the above period, the PID control is resumed. Thus, the control operation can be safely continued even in the event of the occurrence of a soft error.

(2) The controller 202, in the PID control, determines the d-axis target voltage Vd and the q-axis target voltage Vq, which are control values, by adding up the calculation value obtained by multiplying a current input value by the predetermined proportional gain factor Kp and the calculation values obtained by multiplying the integral value of the integrator 2021 and the derivative value of the differentiator 2022 based on a past input value by the predetermined integral gain factor Ki and the derivative gain factor Kd, respectively, with the adder 2026. In the P control, both the integral gain factor Ki and the derivative gain factor Kd are reduced to zero, so that the integral value and the derivative value based on the past input value are not used. Thus, the internal data of the integrator 2021 and the differentiator 2022 can be restored while the P control is executed.

(3) In the third processing method illustrated in FIG. 5, in a period from time T5 to time T2, the controller 202 gradually increases the integral gain factor Ki and the derivative gain factor Kd from zero to the initial values. Thus, a sudden change of the control values is suppressed when the P control is switched to the PID control, enabling realization of smooth control switching.

(4) In the second processing method illustrated in FIG. 4, the controller 202 makes the cycle of the P control longer than the cycle of the PID control in a period from time T1 to time T4. Thus, while the P control is executed, processing time of processing required for continuation of the control operation after the occurrence of the soft error can be ensured.

(5) The controller 202 resets the integral value and the derivative value based on a past input value for use in the PID control after the occurrence of the soft error at time T0. Thus, even when the integral value or the derivative value becomes an abnormal value due to the soft error, the normal PID control can be performed after the resetting.

(6) As illustrated in FIGS. 8 and 9, in a period where the PID control is executed before the occurrence of the soft error at time T0, the steady-state deviation between the target value and the output value is a predetermined value. In a period where the P control is executed after the occurrence of the soft error, the steady-state deviation between the target value and the output value becomes greater than the aforementioned value. Thus, until the internal data of the integrator 2021 and the differentiator 2022 are restored after the occurrence of the soft error, although the steady-state deviation becomes greater as compared to that in normal time, the control operation can be continued.

Second Embodiment

Figure 10:
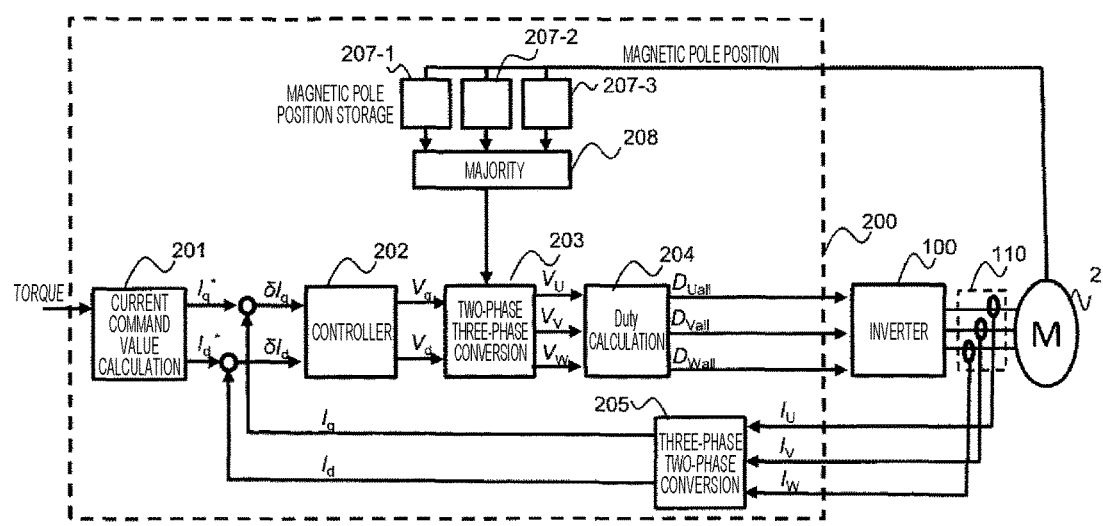
FIG. 10 is a diagram illustrating an entire configuration of an electrically driven power steering apparatus according to a second embodiment of the present invention.

FIG. 10 is a diagram illustrating an entire configuration of the electrically driven power steering apparatus according to the second embodiment of the present invention. In FIG. 10, a difference from the electrically driven power steering apparatus according to the first embodiment illustrated in FIG. 1(*a*) is that the control system 200 further includes magnetic pole position storage portions 207-1, 207-2 and 207-3, and a majority portion 208.

The magnetic pole position storage portions 207-1, 207-2 and 207-3 are parts that function as storage devices for redundantly storing the magnetic pole positions of the motor 2. Magnetic pole position information output from a magnetic pole position sensor, which is not illustrated, arranged on the motor 2 is input into and stored in the magnetic pole position storage portions 207-1 to 207-3.

The majority portion 208 reads out the magnetic pole positions stored in the magnetic pole position storage portions 207-1 to 207-3 and takes a majority vote. The majority portion 208 outputs the results to the two-phase three-phase conversion portion 203. Thus, even when false magnetic pole positions are stored in any of the magnetic pole position storage portions 207-1 to 207-3 due to a soft error or the like, correct magnetic pole positions can be obtained.

Generally, an electrically driven power steering apparatus often uses a brushless motor. When a brushless motor is used as the motor 2, one thing to be concerned when the control system 200 controls the motor 2 is that the control cannot follow a change of the magnetic pole positions of the motor 2 and loses synchronism. In particular, when a resolver is used for the magnetic pole position sensor, it is necessary to compute the magnetic pole positions from a sensor signal, taking time to obtain the magnetic pole positions. Accordingly, when the operation of the control system 200 is resumed after temporal stoppage due to a soft error, the magnetic pole positions cannot be obtained timely, resulting in a risk of loss of synchronism.

Therefore, the electrically driven power steering apparatus of the present embodiment redundantly stores the magnetic pole position information in the magnetic pole position storage portions 207-1 to 207-3 according to the configuration illustrated in FIG. 10. Thus, even in the event of the occurrence of a soft error, the loss of synchronism due to time delay for the computation of the magnetic pole positions is prevented, enabling continuation of the control operation.

For example, assuming that the control cycle of the motor 2 by the control system 200 is about 100 µs to 1 ms and the control needs to be performed about ten times for convergence of the integrator 2021, it takes time of about 1 ms to 10 ms to restore the internal data of the integrator 2021. According to the present invention, as described in the first embodiment, the control operation is continued by performing the P operation during the above period so that loss of synchronism of the motor control is prevented. Furthermore, in cases where a resolver is used for the magnetic pole position sensor as described above, when, for example, the frequency of an excitation signal is 10 kHz, at least one cycle of excitation signal, i.e., time of about 100 µs, is taken for detection of the magnetic pole positions. In the present embodiment, the magnetic pole position information is redundantly stored in the magnetic pole position storage portions 207-1 to 207-3, so that the time for the above can be reduced. When the clock frequency of the processor of the control system 200 is, for example, hundreds of MHz, the recovery of variables required for the operation of the operating system takes processing time of about hundreds to thousands of steps, i.e., time of about 1 to 10 µs. However, the above time is sufficiently shorter than the time for detecting the magnetic pole positions. Therefore, there is no particular problem with the continuation of the motor control after the occurrence of a soft error.

According to the second embodiment of the present invention described above, the electrically driven power steering apparatus further includes the magnetic pole position storage portions 207-1 to 207-3 as storage devices for redundantly storing the magnetic pole positions of the motor 2. Thus, loss of synchronism during the continuation of the motor control after the occurrence of a soft error can be suppressed effectively.

Third Embodiment

In the embodiments described above, an example of a feedback control apparatus was described in which in periods before the occurrence of a soft error and after the restoration of the internal data of the integrator 2021, the PID control is performed as feedback control that uses a current input value and a past input value, and in a period from the occurrence of the soft error to the restoration of the internal data of the integrator 2021, the P control is performed as feedback control that uses a current input value but does not use a past input value. However, the present invention is not limited thereto, but can be applied to a feedback control apparatus that performs a variety of feedback control, e.g., feedback control according to modern control theory. In the following, as the third embodiment of the present invention, an example of the case where the present invention has been applied to a feedback control apparatus for performing feedback control according to modern control theory is described.

In general, feedback control according to modern control theory performs feedback control such that the relationship between the state of a system, which is a control subject, and input is represented by an equation of state and a control value with respect to a control deviation, which is input on the basis of the system state determined by the equation of state, is determined. For example, when the input value is represented by u(t) and the system state is represented by x(t), the equation of state representing their relationship is represented by formula (2) below. However, in formula (2), both A and B are predetermined coefficient matrices.

[Mathematical Formula 2]

$$\dot{x}(t) = A \cdot x(x) + B \cdot u(t) \qquad (2)$$

Here, when the control value to be output is represented by y(t), the control value y(t) is determined by the input value u(t) and the system state x(t) as indicated by formula (3) below. However, in formula (3), both C and D are predetermined coefficient matrices.

[Mathematical Formula 3]

$$y(t)=C\cdot x(t)+D\cdot u(t) \quad (3)$$

In the aforementioned formula (3), the system state x(t) is historical data that is updated by a repetition of the calculation of formula (2).

Figure 11:
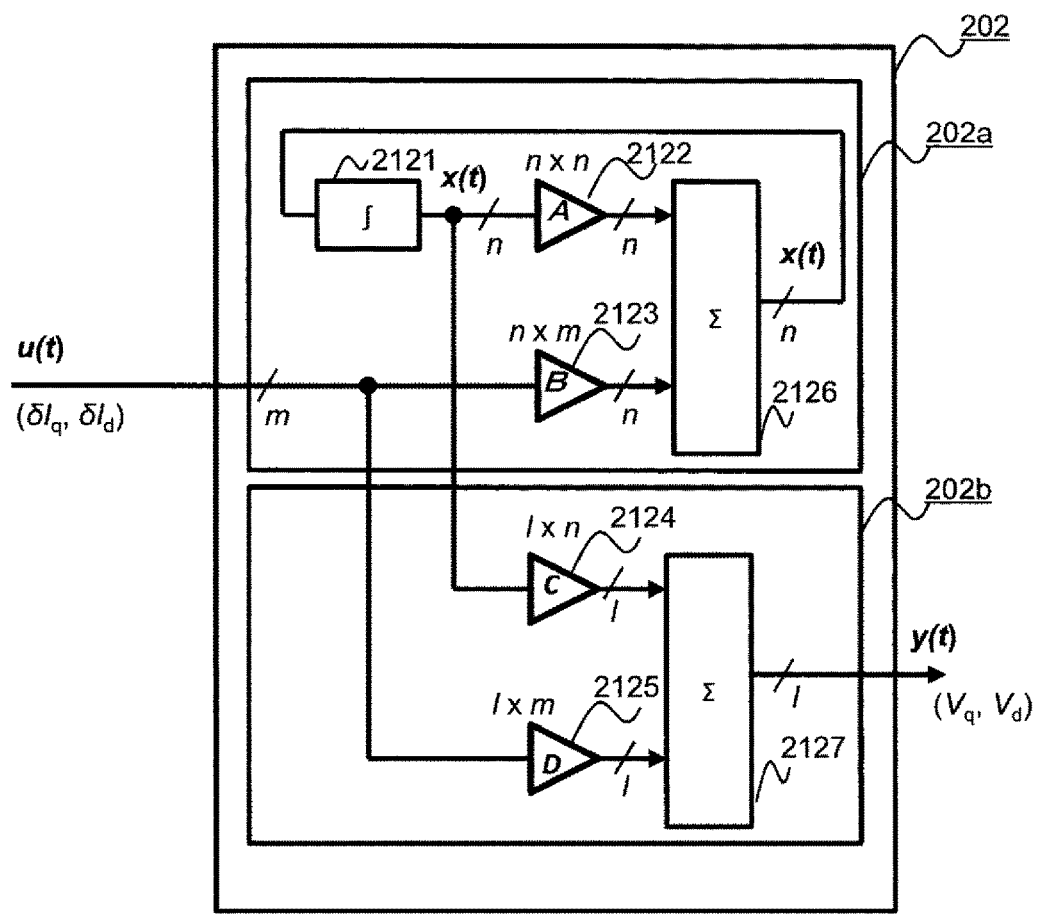
FIG. 11 is a diagram illustrating a control block of a controller according to a third embodiment of the present invention.

FIG. 11 is a control block diagram of the controller 202 according to the third embodiment of the present invention where the feedback control according to modern control theory described above, i.e., control based on a past system state (hereinafter, the "state control") is performed. As illustrated in FIG. 11, the controller 202 that performs the state control in the present embodiment includes a state generating portion 202a and an output signal generating portion 202b.

As both sides of the aforementioned formula (2) are integrated, formula (4) below is derived.

[Mathematical Formula 4]

$$x(t)=\int\{A\cdot x(t)+B\cdot u(t)\}dt \quad (4)$$

In the controller 202 of the present embodiment illustrated in FIG. 11, the state generating portion 202a includes, on the basis of formulae (2) and (4), control blocks of an integrator 2121, amplifiers 2122, 2123 corresponding to the coefficient matrices A and B, respectively, and an adder 2126. The output signal generating portion 202b includes, on the basis of formula (3), control blocks of amplifiers 2124, 2125 corresponding to the coefficient matrices C and D, respectively, and an adder 2127.

The coefficient matrices A, B, C, D each represent matrix calculations. For example, when the system state x(t) is n-dimension, the input value u(t) is m-dimension, and the control value y(t), which is an output of the controller 202, is one-dimension, the coefficient matrices A, B, C, D are represented by determinants A: n×n, B: n×m, C: 1×n, and D: 1×m, respectively.

In the present embodiment, as described in the first embodiment, when the comparator 211 determines an abnormality and detects the occurrence of a failure (SEU), the controller 202 temporarily reduces the value of the coefficient matrix C to zero. The control value y(t) output from the controller 202 at this time is represented by formula (5) below by plugging in zero for C in the aforementioned formula (3).

[Mathematical Formula 5]

$$y(t)=D\cdot u(t) \quad (5)$$

According to the aforementioned formula (5), it can be seen that, when C=0 in the controller 202, the aforementioned state control can transition into the control that does not use a past system state (hereinafter the "non-state control"). While the non-state control is executed, the controller 202 continues the operation of the motor 2, which is a control subject, and converges and restores the value of the system state x(t), which is stored in the integrator 2121 and has been damaged by the failure (SEU). Then, the controller 202 can resume the state control.

In the present embodiment, both the input value u(t) to the controller 202 and the control value y(t) output from the controller 202 are values indicated by several variables. Here, when U(t)=(δIq, δId), y(t)=(Vq, Vd), the input value u(t) and the output value y(t) can be applied to the electrically driven power steering apparatus of FIG. 1(a) described in the first embodiment.

Figure 12:
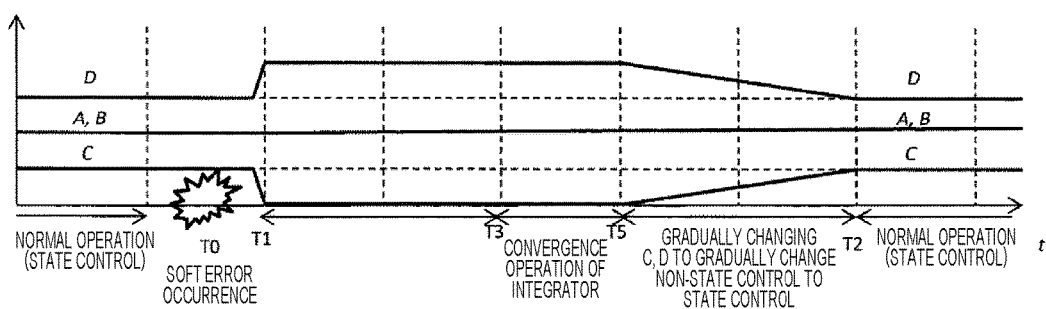
FIG. 12 is a diagram illustrating the state of changes of coefficient matrices according to the third embodiment of the present invention.

FIG. 12 is a diagram illustrating the state of changes of the coefficient matrices A, B, C, D according to the third embodiment of the present invention. The coefficient matrices A, B, C, D are represented as determinants formed of multiple matrix elements. However, in FIG. 12, for the sake of easy understanding of the state of their changes, the levels of the coefficient matrices are representatively indicated by the levels of arbitrary elements of the determinants.

As illustrated in FIG. 12, the controller 202 increases the coefficient matrix D and reduces the coefficient matrix C to zero at time T1 so that the state control is switched to the non-state control. Then, as the internal data of the integrator 2121 is restored, the controller 202 gradually reduces the coefficient matrix D and gradually increases the coefficient matrix C in a period from time T5 to time T2 so that the non-state control gradually transitions to the state control. At time T2, when the coefficient matrices C, D are returned to values held before the occurrence of the failure, the controller 202 performs the state control in a subsequent period.

Here, as is apparent from formula (5), when C=0, the value of the system state x(t) does not affect the value of the control value y(t) output from the controller 202. Therefore, it is not necessary to change the values of the coefficient matrices A, B during the non-state control. Rather, as illustrated in FIG. 12, no change is desirable for acceleration of the convergence and restoration of the system state x(t).

Figure 13:
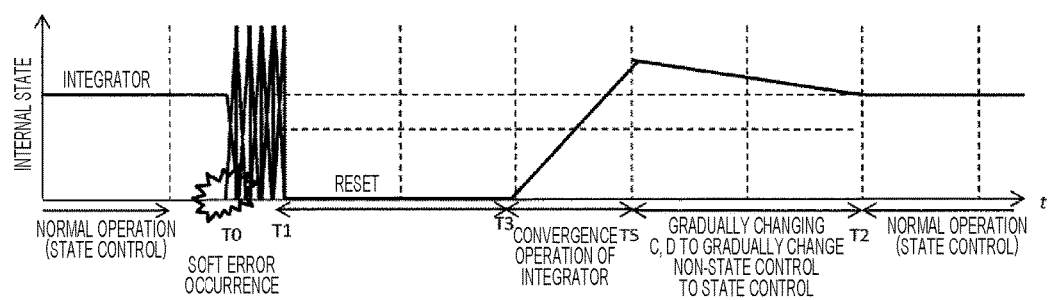
FIG. 13 is a diagram illustrating the state of a change of internal data of an integrator according to the third embodiment of the present invention.

FIG. 13 is a diagram illustrating the state of a change of the internal data of the integrator 2121 according to the third embodiment of the present invention. The internal state of the integrator 2121 is represented by several variables. However, in FIG. 13, for the sake of easy understanding of the state of a change of the internal state of the integrator 2121, the level of the value of the internal data of the integrator 2121 is representatively indicated by the level of an arbitrary element (variable) of the several variables.

As illustrated in FIG. 13, when a soft error occurs at T0, the internal data of the integrator 2121 becomes indeterminate. Then, as the reset processing is performed, the internal data of the integrator 2121 is reset to zero at time T1. When the resetting of the integrator 2121 is canceled at time T3, the convergence operation of the integrator 2121 begins, and the internal data of the integrator 2121 is gradually restored from zero. When the integrator 2121 is thus converged, at time T2 onwards, the coefficient matrices C, D are set to the same values as those held before the occurrence of the failure and the initial state control is restored.

As described above, according to the present embodiment, in the feedback control according to modern control theory, even when the historical data of the system state x(t) required for the state control is damaged by a failure (SEU), the control operation can be continued by the non-state control. Furthermore, while the control operation is continued in the non-state control, the historical data of the system state x(t) can be converged and restored. Therefore, the state control can be resumed without bumps in control.

According to modern control theory, for example, an observer is used for estimation of the quantity of state in the system. Furthermore, a Kalman filter is often used for removal of the influence of disturbances. With a Kalman filter, an estimate value of the system state can be indicated as historical data, which is represented as a form of linear combination that uses all the observation values observed by then. When the system receives a control input, an estimate value of the system state including the historical data of input values is determined.

Furthermore, in the embodiments described above, the cases where one inverter 100 is mounted on the electrically driven power steering apparatus were described. However, multiple inverters may be mounted. In this case, multiple inverters can be used to drive multiple motors or windings to allow redundancy of inverters, motors, and windings so that the operation can be continued even in the case of their malfunction.

In the embodiments described above, examples of a feedback control apparatus that performs feedback control in an electrically driven power steering apparatus were described. However, the present invention may be applied to those used in other devices or systems insofar as they perform feedback control.

The embodiments and various variations described above are mere examples, and the present invention is not limited to these contents as long as the features of the invention are not impaired. The present invention is not limited to the aforementioned embodiments, but various changes may be made without departing from the gist of the present invention.

REFERENCE SIGNS LIST 2 motor
100 inverter
200 control system
201 current command value calculation portion
202 controller
203 two-phase three-phase conversion portion
204 duty calculation portion
205 three-phase two-phase conversion portion
207-1, 207-2, 207-3 magnetic pole position storage portion
208 majority portion
2021 integrator
2022 differentiator
2023, 2024, 2025 amplifier
2026 adder

The invention claimed is:

1. A feedback control apparatus for determining a control value for controlling an output value on the basis of an input value depending on a difference between a target value and the output value, wherein
in a first period before occurrence of a soft error, the control value is determined by means of first feedback control using a current input value and a past input value,
in a predetermined second period after the occurrence of the soft error, the control value is determined by means of second feedback control using a current input value but not using a past input value,
after a lapse of the second period, the first feedback control is resumed, and
in the first feedback control, the control value is determined by adding up a calculation value obtained by multiplying the current input value by a predetermined first factor and a calculation value obtained by multiplying a value based on the past input value by a predetermined second factor, and in the second feedback control, the second factor is reduced to zero, and a value based on the past input value is not used.

2. The feedback control apparatus according to claim 1, wherein in a predetermined fourth, the second factor is gradually increased from zero to an initial value.

3. The feedback control apparatus according to claim 1, wherein in a predetermined fifth period in the second period, a cycle of the second feedback control is made longer than a cycle of the first feedback control.

4. The feedback control apparatus according to claim 1, wherein in the first period, PID control is performed as the first feedback control, and in the second period, P control is performed as the second feedback control.

5. The feedback control apparatus according to claim 1, wherein in the first period, feedback control based on an equation of state according to modern control theory is performed as the first feedback control and the second feedback control.

6. The feedback control apparatus according to claim 1, wherein after the soft error occurs, a value based on the past input value used in the first feedback control is reset.

7. An electrically driven power steering apparatus comprising:
the feedback control apparatus according to claim 1;
a motor for generating an assist torque to a steering mechanism; and
an inverter for driving the motor on the basis of a control value determined by the feedback control apparatus.

8. The electrically driven power steering apparatus according to claim 7, further comprising a storage device for redundantly storing a magnetic pole position of the motor.

* * * * *